United States Patent
Kolmykov-Zotov et al.

(10) Patent No.: US 7,679,617 B2
(45) Date of Patent: Mar. 16, 2010

(54) APPROPRIATELY SIZED TARGET EXPANSION

(75) Inventors: Alexander Kolmykov-Zotov, Sammamish, WA (US); Patrick Baudisch, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 512 days.

(21) Appl. No.: 11/675,171

(22) Filed: Feb. 15, 2007

(65) Prior Publication Data

US 2008/0198160 A1    Aug. 21, 2008

(51) Int. Cl.
   *G06T 17/20*    (2006.01)
(52) U.S. Cl. .................. 345/423; 345/473; 382/103; 382/117; 715/747; 715/765; 715/814; 715/815; 715/788; 715/838
(58) Field of Classification Search ......... 345/423, 345/473; 382/103, 117; 715/764, 814
   See application file for complete search history.

(56) References Cited

U.S. PATENT DOCUMENTS 7,530,030 B2 *  5/2009  Baudisch ................ 715/838
2007/0255707 A1 * 11/2007  Tresser et al. ................ 707/6

OTHER PUBLICATIONS

Baudisch, P., Cutrell, E., Robbins, D., Czerwinski, M., Tandler, P., Bederson, B., and Zierlinger, A., Drag-and-pop and Drag-and-pick: Techniques for accessing remote screen content on touch- and pen-operated systems, *Proc. Interact'03*, pp. 57-64.

Baudisch, P. and Gutwin, C., Multiblending: Displaying overlapping windows simultaneously without the drawbacks of alpha, *Proc. of CHI'04*, pp. 367-374.

Baudisch, P., Cutrell, E., Hinckley K., and Eversole, A., Snap-and-go: Helping users align objects without the modality of traditional snapping, *Proc. of CHI'05*, pp. 301-310.

Beaudouin-Lafon, M. & Mackay, W., Reification, polymorphism and reuse: Three principles for designing visual interfaces, *Proc. AVI'00*, pp. 102-109.

Bell, B., Feiner, S., and Höllerer, T., View management for virtual and augmented reality, *Proc. UIST '01*, pp. 101-110.

Benko, H., Wilson, A., and Baudisch, P., Precise selection techniques for multi-touch screens, *Proc. CHI'06*, pp. 1263-1272.

Bier, E., and Stone, M., Snap dragging, *Proc. SIGGRAPH'86*, pp. 233-240.

(Continued)

*Primary Examiner*—Kimbinh T Nguyen
(74) *Attorney, Agent, or Firm*—Lyon & Harr, LLP; Katrina A. Lyon

(57) ABSTRACT

The present starburst target expansion technique connects targets to peripheral screen space to produce reasonably sized tiles for all targets including those that are located inside of a cluster. The resulting layout is characterized by lines escaping from the cluster center. By providing targets located inside a cluster with access to empty screen space, the present starburst target expansion technique is able to assign screen space to targets that remain small if expanded using the traditional Voronoi approach. If used on a device with limited input accuracy, such as a pen-based tablet or a touch screen-based kiosk system, target expansion via the starburst target expansion technique can lead to substantial performance improvements.

19 Claims, 14 Drawing Sheets

OTHER PUBLICATIONS

Blanch, R., Guiard, Y., Beaudouin-Lafon, M., Semantic pointing: Improving target acquisition with control display ration adaptation, *Proc. CHI'04*, pp. 519-526.

Convex hull, http://en.wikipedia.org/wiki/Convex_hull, published Feb. 19, 2007.

Fekete, J.-D., and Plaisant, C., Excentric labeling: Dynamic neighborhood labeling for data visualization, *Proc. CHI'99*, pp. 512-519.

Furnas, G. W., and Qu, Y., Shape manipulation using pixel rewrites, *Proc. of Visual Computing 2002*, (VC'02), pp. 630-639.

Grossman, T., Balakrishnan, R., The bubble cursor: Enhancing target acquisition by dynamic resizing of the cursor's activation area, *CHI 2005 Conf. Proc.: ACM Conf. on Human Factors in Computing Systems*, pp. 281-290.

Grossman, T., Balakrishnan, R., A probabilistic approach to modeling two-dimensional pointing, *TOCHI*, Sep. 2005, vol. 12, No. 3, pp. 435-459.

Guiard, Y., Blanch, R., and Beaudouin-Lafon, M., Object pointing: A complement to bitmap pointing in GUIs, Proc. of the 2004 Conf. on Graphics Interface, 2004, vol. 62, pp. 9-16.

Guibas, L., and Stolfi, J., Primitives for the manipulation of general subdivisions and computation of Voronoi diagrams, *ACM Trans. Graph.*, 1985, vol. 4, No. 2, pp. 75-123.

Gutwin, C., Improving focus targeting in interactive fisheye views, *Proc. CHI'02*, pp. 267-274.

Kakoulis, K., and Tollis, I., A unified approach to labeling graphical features, *Int'l J. of Computational Geometry and Applications*, 2003, vol. 13, No. 1, pp. 23-59.

Lischinski, D., Incremental delaunay triangulation, Paul Heckbert, ed., *Graphics Gems IV*, Academic Press, Boston, 1994, pp. 47-59.

McGuffin, M., and Balakrishnan, R., Fitts' law and expanding targets: Experimental studies and designs for user interfaces, *TOCHI*, Dec. 2005, vol. 12, No. 4, pp. 388-422.

McGuffin, M., and Balakrishnan, R., Acquisition of expanding targets, *Proc. CHI'02*, pp. 57-64.

Parker, J., Mandryk, R., Nunes, M., and Inkpen, K., Improving target acquisition for pointing input on table-top displays, *Proc. INTERACT2005*, pp. 80-93.

Potter, R. L., Weldon, L. J., amd Schneiderman, B., Improving the accuracy of touch screens: An experimental evaluation of three strategies, *Proc. CHI'88*, 1988, pp. 27-32.

Sears, A. and Schneiderman, B., High precision touchscreens: Design strategies and comparisons with a mouse, *Int'l J. Man-Mach. Stud.*, Jun. 1989, vol. 34, No. 4, pp. 593-613.

Sederberg, T. and Parry, S., Free-form deformation of solid geometric models, *Proc. SIGGRAPH'86*, pp. 151-160.

Swaminathan, K., and Sato, S., Interaction design for large displays, *Interactions*, 1997, vol. 4, No. 1, pp. 15-24.

Voronoi, http://en.wikipedia.org/wiki/Voronoi_diagram, published Feb. 20, 2007.

Worden, A., Walker, N., Bharat, K., and Hudson, S., Making computers easier for older adults to use: Area cursors and sticky icons, *Proc. CHI'97*, pp. 266-271.

\* cited by examiner

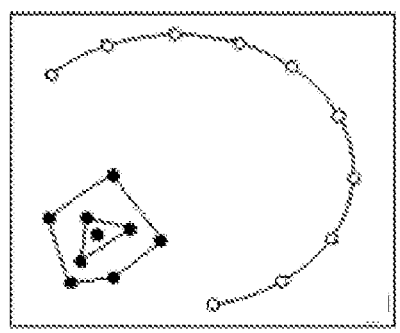
FIG. 18
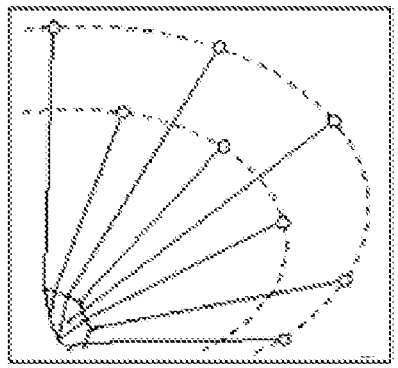
FIG. 19
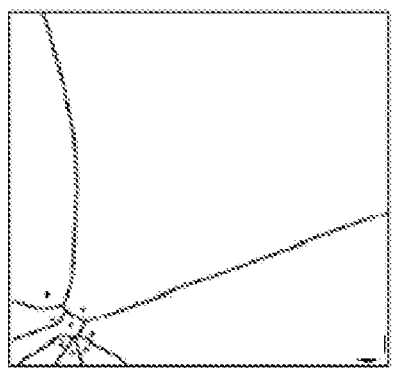 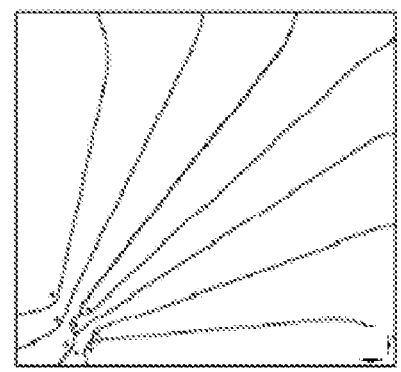
FIG. 20     FIG. 21

APPROPRIATELY SIZED TARGET EXPANSION

BACKGROUND

Acquiring a small target can be challenging and generally results in long targeting times and high error rates. This is especially true when the target is clustered with other targets. One technique designed to help users acquire small targets, that is useful when targets are uniformly distributed on the screen, is the bubble cursor technique. In this technique, a cursor snaps to the closest target. There is a bubble around the cursor that varies in size such that it contains the closest target. Employing a bubble cursor may be considered a target expansion technique. This becomes clear when one labels each pixel on the screen according to which target will be acquired if the pixel is selected (clicked on) with an input device. This resulting partitioning of the screen space is also referred to as a Voronoi tessellation. The bubble cursor target expansion technique is beneficial for users. Instead of having to aim for a small target, a user can click anywhere inside the tile containing the target. This approach reduces targeting time for layouts of uniformly distributed targets.

Unfortunately, in real-world applications uniform distributions are an exception rather than the norm. Locally dense clusters of targets emerge for a variety of reasons. A user interface may represent a real-world geometry with a non-uniform structure, such as cities on a map. In other cases, it is users who manually create clusters, for example, when grouping icons on their desktops or when organizing links inside a web page. Or clusters may merge from the structure of visualized data, or may appear from targets being input into a system such as would be the case in an air traffic control system and display.

When applied to a cluster of targets, a bubble cursor shows little effect. Targets located inside a cluster are surrounded by little empty screen space. As a result, the tiles generated by the expansion are small—associated targets remain hard to acquire. When used on a device with imprecise input, such as a touch-screen kiosk, the acquisition of such targets will be error prone. The same holds true for a pen input.

Limitations in handling target clusters are not unique to the bubble cursor target expansion technique, but faced by all target expansion techniques. Some of them even impact performance negatively if applied to target clusters. Interactions between closely adjacent expanding targets sometimes cause targets to "escape" from the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present starburst target expansion technique is especially effective for target clusters. It is called the starburst target expansion technique because expanded targets of a target cluster resemble a starburst. In general, the present technique identifies areas of available display screen space and then expands targets into this available space. In expanding the targets, it preferably grows a skeleton or line from each target into available space, and then expands that line into a selectable surface (e.g., it can be clicked on with a cursor).

One exemplary embodiment of the present starburst target expansion technique converts a given target layout into an expanded tile layout. In order to do this, targets that require additional expansion are identified. Targets are then organized into cliques of space donors and space recipients, and the targets of each clique are organized into nested rings. Once the targets of each clique are organized into nested rings, a skeleton or "claim lines" are created and routed for each target (of the clique). The claim lines are then grown into expanded tiles.

It is noted that while the foregoing limitations in existing target selection schemes described in the Background section can be resolved by a particular implementation of the present starburst target expansion technique, this is in no way limited to implementations that just solve any or all of the noted disadvantages. Rather, the present technique has a much wider application as will become evident from the descriptions to follow.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features, aspects, and advantages of the disclosure will become better understood with regard to the following description, appended claims, and accompanying drawings where:

FIG. 18 is an example of how the present starburst target expansion technique places claim line endpoints into the available screen space in one embodiment of the present starburst target expansion technique.

FIG. 19 is an example of how one exemplary embodiment of the present starburst target expansion technique organizes claim line endpoints in multiple layers.

FIG. 20 is an example of how one exemplary embodiment of the present starburst target expansion technique lays out tiles.

FIG. 21 is an example of how organizing claim line endpoints in multiple layers helps thicken targets.

DETAILED DESCRIPTION

1.0 The Computing Environment

Before providing a description of embodiments of the present starburst target expansion technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
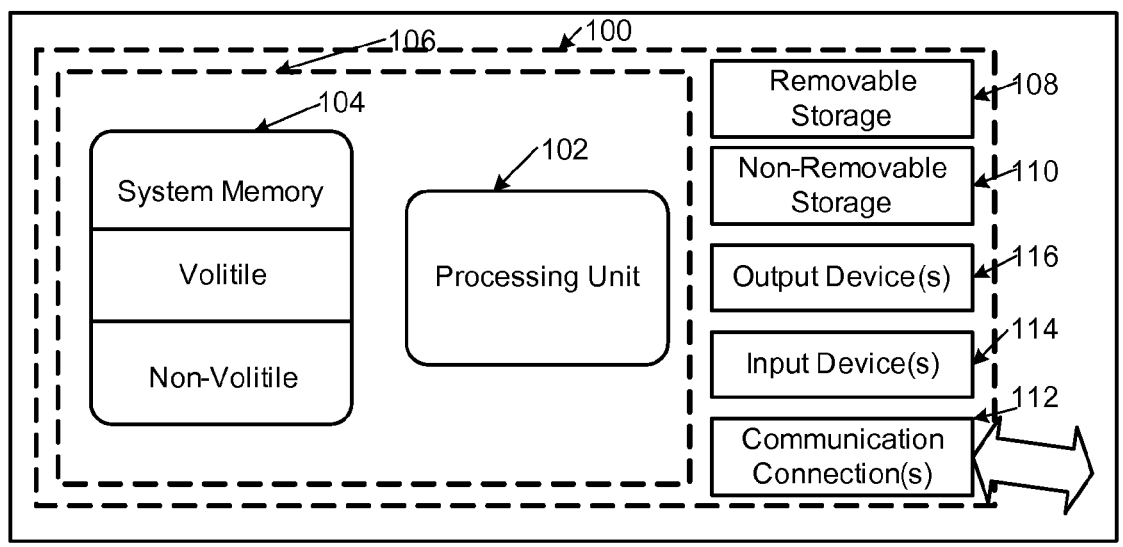
FIG. 1 is a diagram depicting a general purpose computing device constituting an exemplary system for a implementing a component of the present starburst target expansion technique.

FIG. 1 illustrates an example of a suitable computing system environment. The computing system environment is only one example of a suitable computing environment and is not intended to suggest any limitation as to the scope of use or functionality of the present starburst target expansion technique. Neither should the computing environment be interpreted as having any dependency or requirement relating to any one or combination of components illustrated in the exemplary operating environment. With reference to FIG. 1, an exemplary system for implementing the present starburst target expansion technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may have various input device(s) 114 such as keyboard, mouse, microphone, pen, voice input device, touch input device, and so on. Output device(s) 116 such as a display, speakers, a printer, and so on may also be included. All of these devices are well known in the art and need not be discussed at length here.

Device 100 can include a camera as an input device 114 (such as a digital/electronic still or video camera, or film/photographic scanner), which is capable of capturing a sequence of images, as an input device. Further, multiple cameras could be included as input devices. The images from the one or more cameras can be input into the device 100 via an appropriate interface (not shown). However, it is noted that image data can also be input into the device 100 from any computer-readable media as well, without requiring the use of a camera.

The present starburst target expansion technique may be described in the general context of computer-executable instructions, such as program modules, being executed by a computing device. Generally, program modules include routines, programs, objects, components, data structures, and so on, that perform particular tasks or implement particular abstract data types. The present starburst target expansion technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present starburst target expansion technique.

2.0 Starburst Target Expansion Technique

The present starburst target expansion technique connects targets to peripheral screen space to produce reasonably sized tiles for all targets including those that are located inside of a cluster. The resulting layout is characterized by a skeleton or lines, escaping from the cluster center. By providing targets located inside a cluster with access to empty screen space, the present starburst target expansion technique is able to assign screen space to targets that remain small if expanded using the traditional Voronoi approach. If used on a device with limited input accuracy, such as a pen-based tablet or a touch screen-based kiosk system, this can lead to substantial performance improvements.

2.1 Architecture.

Figure 2:
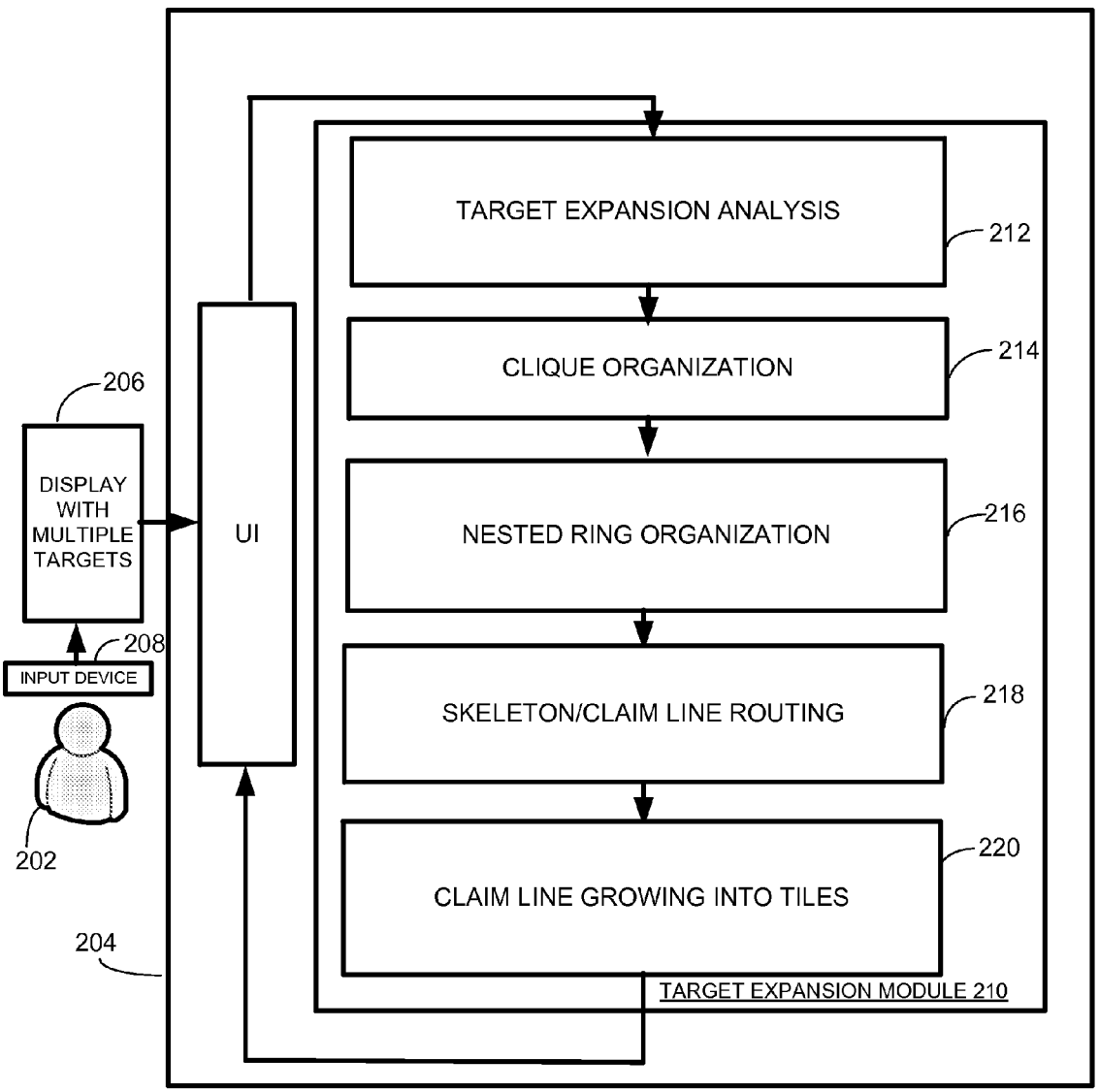
FIG. 2 is a diagram depicting a high level system architecture and environment employed in one embodiment of the present starburst target expansion technique.

FIG. 2 provides an exemplary architecture wherein the present interactive starburst target expansion technique can be practiced. A user 202 performs targeting tasks using a computing device 204 with a monitor 206 and a user input device 208 such as a mouse, pen or similar device. The computing device 204 may contain a target expansion module 210 that can employ a screen space analysis module 212, a target clique organization module 214, a target nested ring organization module 216, a skeleton creation or claim line routing module 218 and a claim line growing module 220. Typical functions and processes employed by these modules will be discussed in greater detail below.

2.2 Overview of the Target Expansion Process

Figure 3:
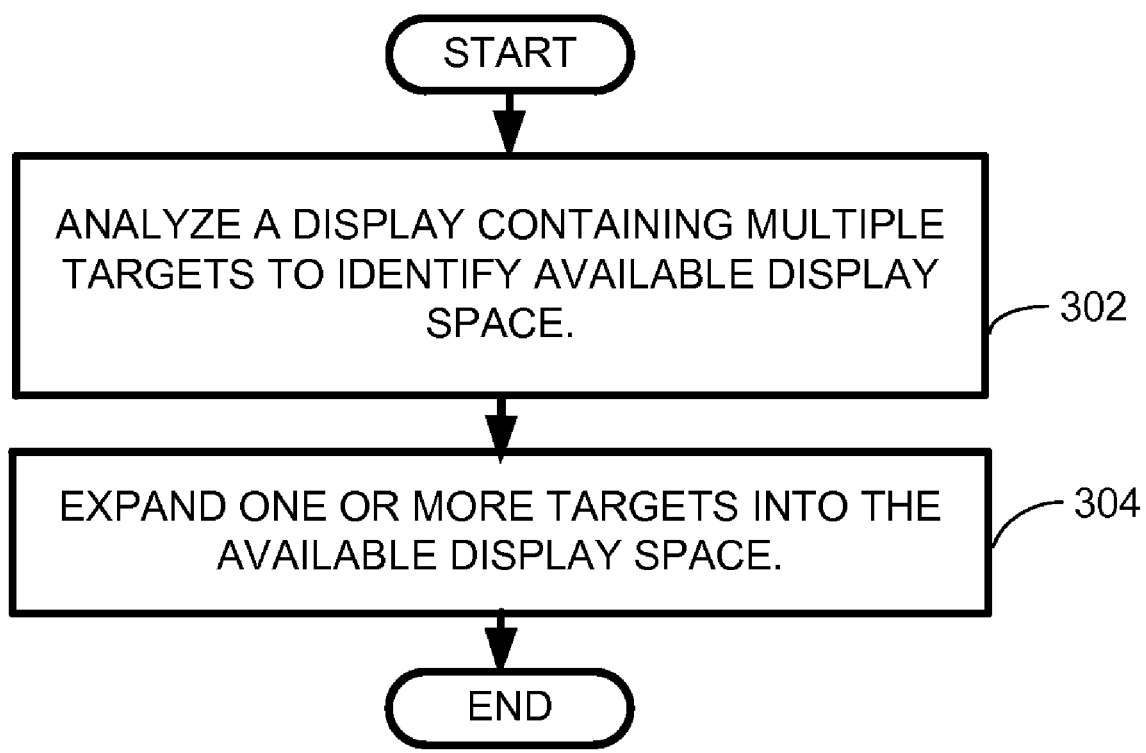
FIG. 3 is a flow diagram depicting one exemplary embodiment of a process employing the present starburst target expansion technique.

FIG. 3 depicts a simple exemplary flow diagram showing how one embodiment of the present starburst target expansion technique converts a given target layout into an expanded tile layout. The present starburst target expansion technique first identifies areas of available screen space (box 302), and then expands one or more targets into the available screen space (box 304).

Figure 4:
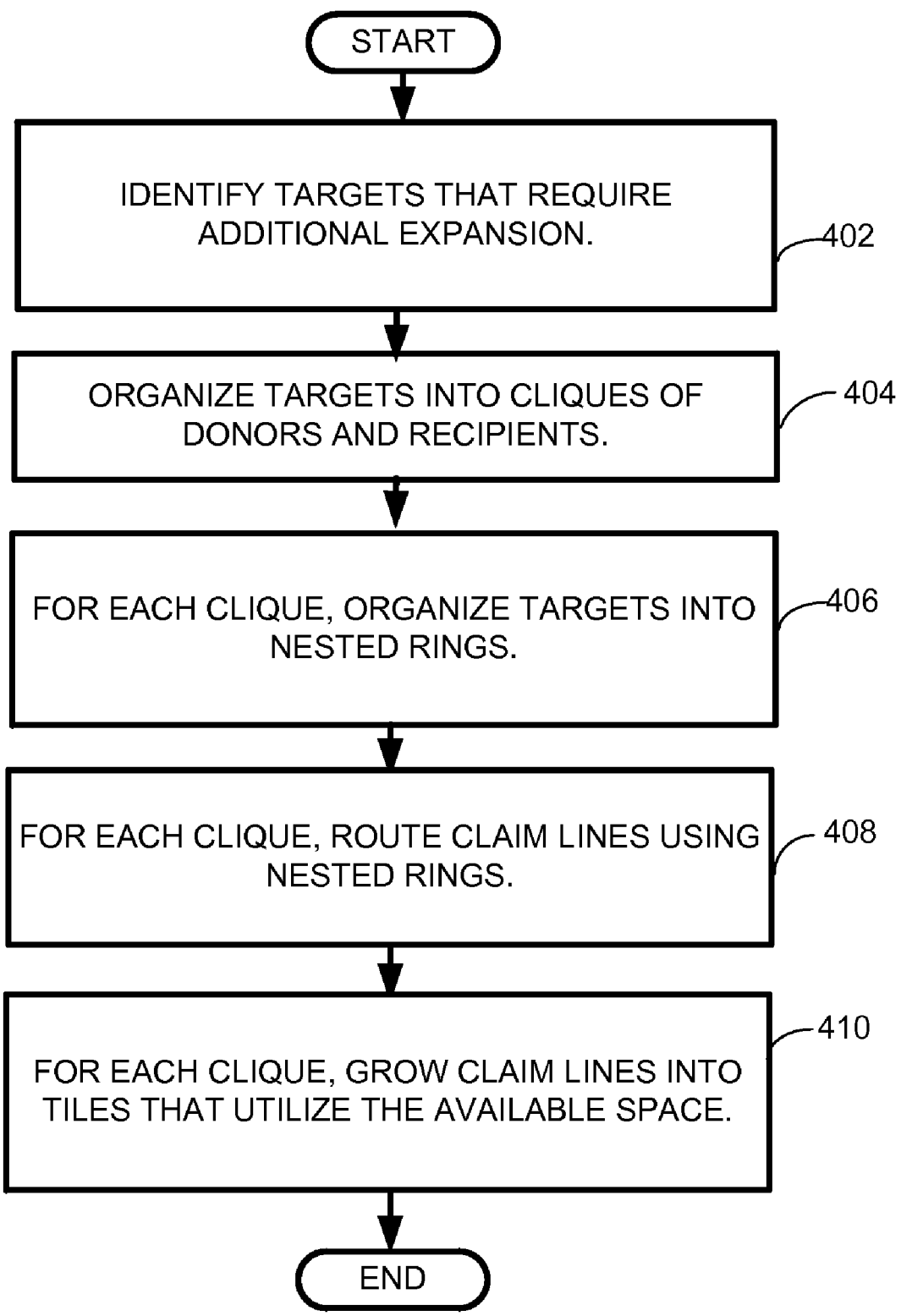
FIG. 4 is a flow diagram depicting another exemplary embodiment of a process employing the present starburst target expansion technique.

FIG. 4 depicts another exemplary flow diagram showing how another embodiment of the present starburst target expansion technique converts a given target layout into an expanded tile layout. As shown in FIG. 4, box 402, targets that require additional expansion are identified. Targets are then organized into cliques (box 404) and the targets of each clique are then organized into nested rings (box 406). Once the targets of each clique are organized into nested rings, a skeleton or "claim lines" are created and routed for each target (of the clique), as shown in box 408. The claim lines are then finally grown into tiles (box 410). These actions, which may be applicable in many embodiments, are discussed in greater detail in the paragraphs below.

2.2.1 Identifying Targets that Require Additional Expansion.

Figure 5:
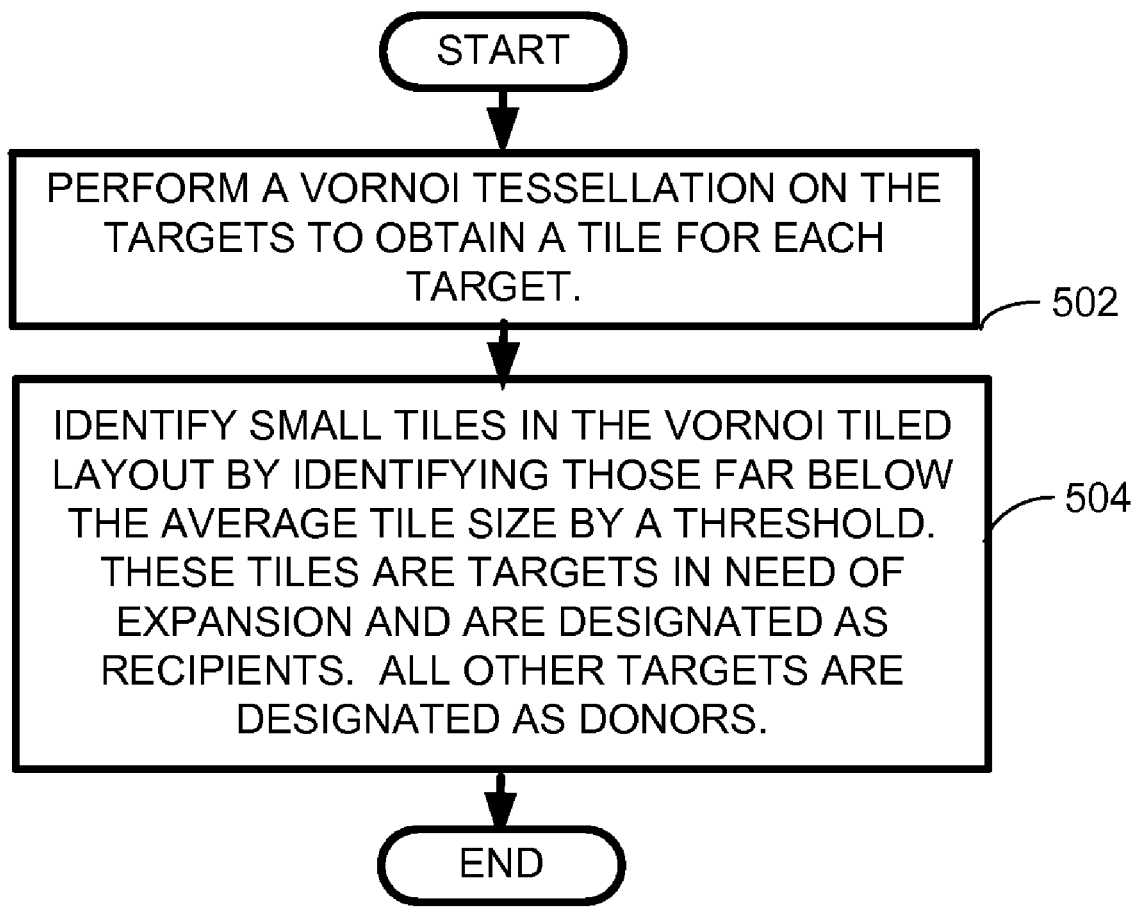
FIG. 5 is a flow diagram depicting a process of identifying targets that need additional expansion in one embodiment of the present starburst target expansion technique.
Figure 6:
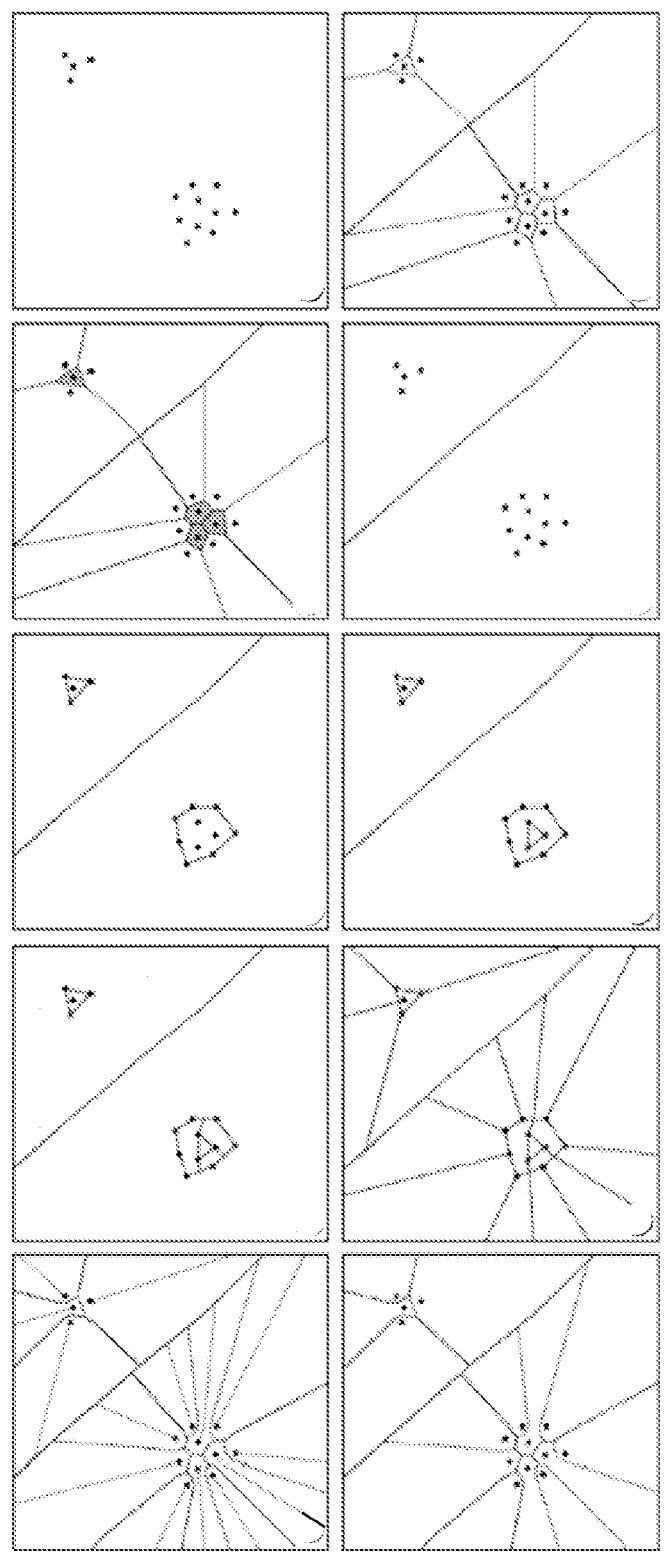
FIG. 6 is an image sequence depicting an example sequence of expanding targets according to one exemplary embodiment of the present starburst target expansion technique.

FIG. 5 provides a flow chart for identifying targets that require additional expansion, while FIG. 6 provides an image sequence depicting the creation of expanded targets using the present starburst target expansion technique which is helpful in visualizing various aspects of the technique.

The present starburst target expansion technique begins by identifying targets (shown in the first row, left image of FIG. 6) that require expansion, as shown in FIG. 5, block 502. In one embodiment of the technique this involves performing a conventional Voronoi tessellation on the targets (shown in the first row, right, of FIG. 6). The technique then identifies small tiles in that Voronoi layout (shown in FIG. 5, block 504). Tiles which have surfaces that fall below the average tile size by a threshold (in one embodiment a factor of 5) are tagged as tiles in need of expansion and are called recipients. In FIG. 6, second row, left, these recipients are highlighted by shading. All other targets are tagged as donors.

2.2.2 Organizing Targets into Cliques

Figure 7:
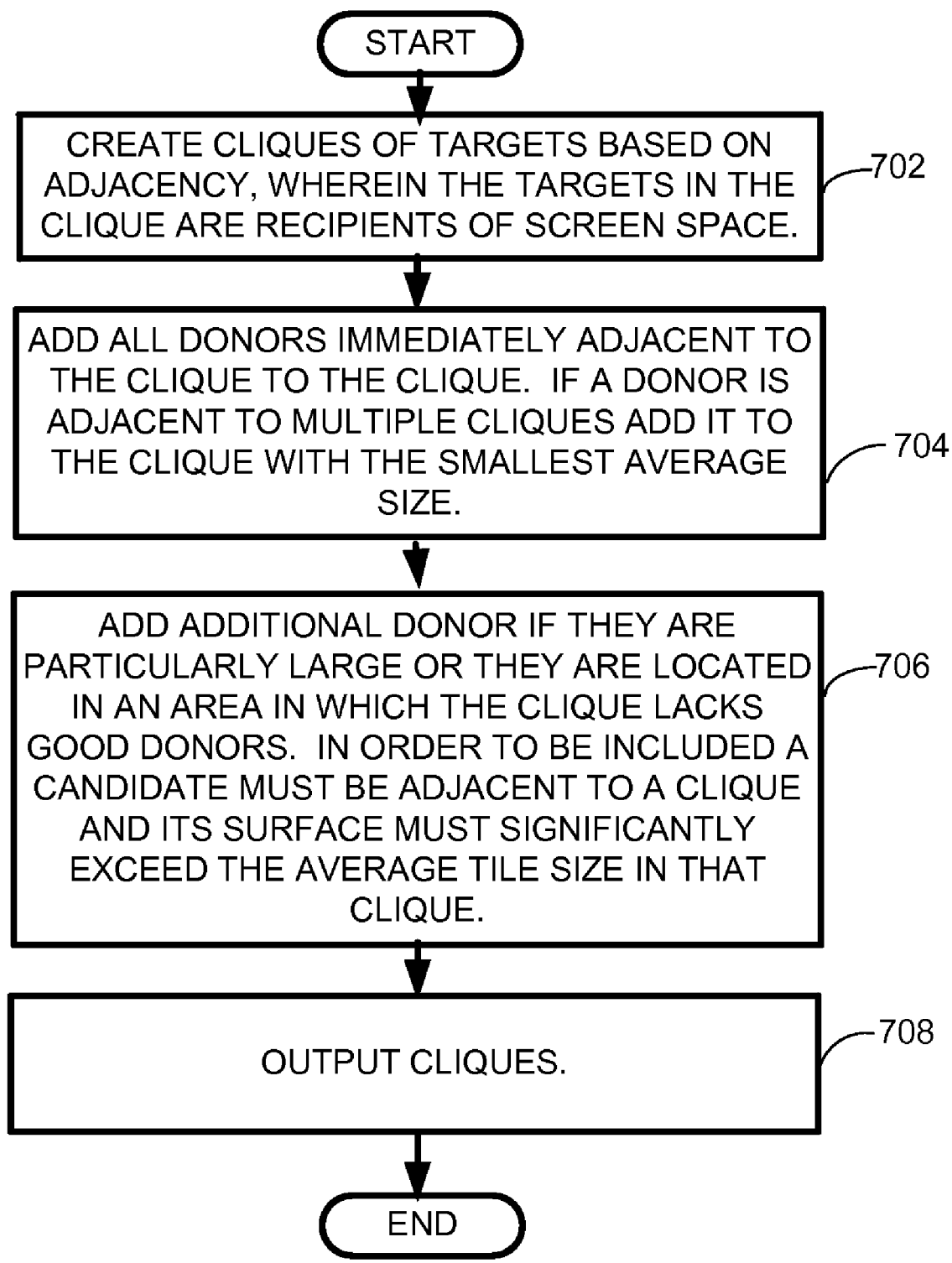
FIG. 7 is a flow diagram depicting a process of organizing targets into cliques of donor and recipient targets in one embodiment of the present starburst target expansion technique.

In one embodiment, as mentioned in the section above, the present starburst target expansion technique manages the redistribution of screen space based on what is referred to as a clique. A clique is a set of co-located donors and recipients. Within a clique, donors provide the screen space used to expand recipients. In one embodiment, the starburst target expansion technique computes cliques as shown in FIG. 7. First, it creates cliques by clustering recipients based on adjacency (block 702). In FIG. 6, as shown in the second row, left image, this results in a clique with three recipients and a clique with a single recipient. Second, as shown in block 704 of FIG. 7, the technique adds all donors immediately adjacent to a clique of recipients to that clique. In case a donor is adjacent to multiple cliques the donor is added to the cluster with the smallest average tile size. In the example of FIG. 6, second row, left image, this adds three donors to the single-recipient clique in the top left, all others to the three-recipient clique. Third, as shown in FIG. 7, block 706, the starburst target expansion technique adds additional donors if they are particularly large or if they are located in an area in which the clique lacks good donors. In order to be included, a candidate must be adjacent to a clique and its surface must significantly exceed the average tile size in that clique (in one working embodiment a threshold factor of 5 was used). In FIG. 6, second row, left image, all donors were already added in the previous step, so no further addition of donors takes place. The screen has now been partitioned into cliques (FIG. 7, block 708 and FIG. 6, second row, right image). For the rest of the technique, processing takes place separately for each of these cliques. The goal of the next actions is to provide targets located on the inside of a clique with access to screen space in the periphery of the clique. In order to reach the periphery, claim lines of inner targets need to pass between outer targets and so passages between targets may become potential bottlenecks. The recipient/donor labeling is therefore dropped and replaced by a different representation that reflects potential bottlenecks.

2.2.3 Organizing Targets into Nested Rings.

Figure 8:
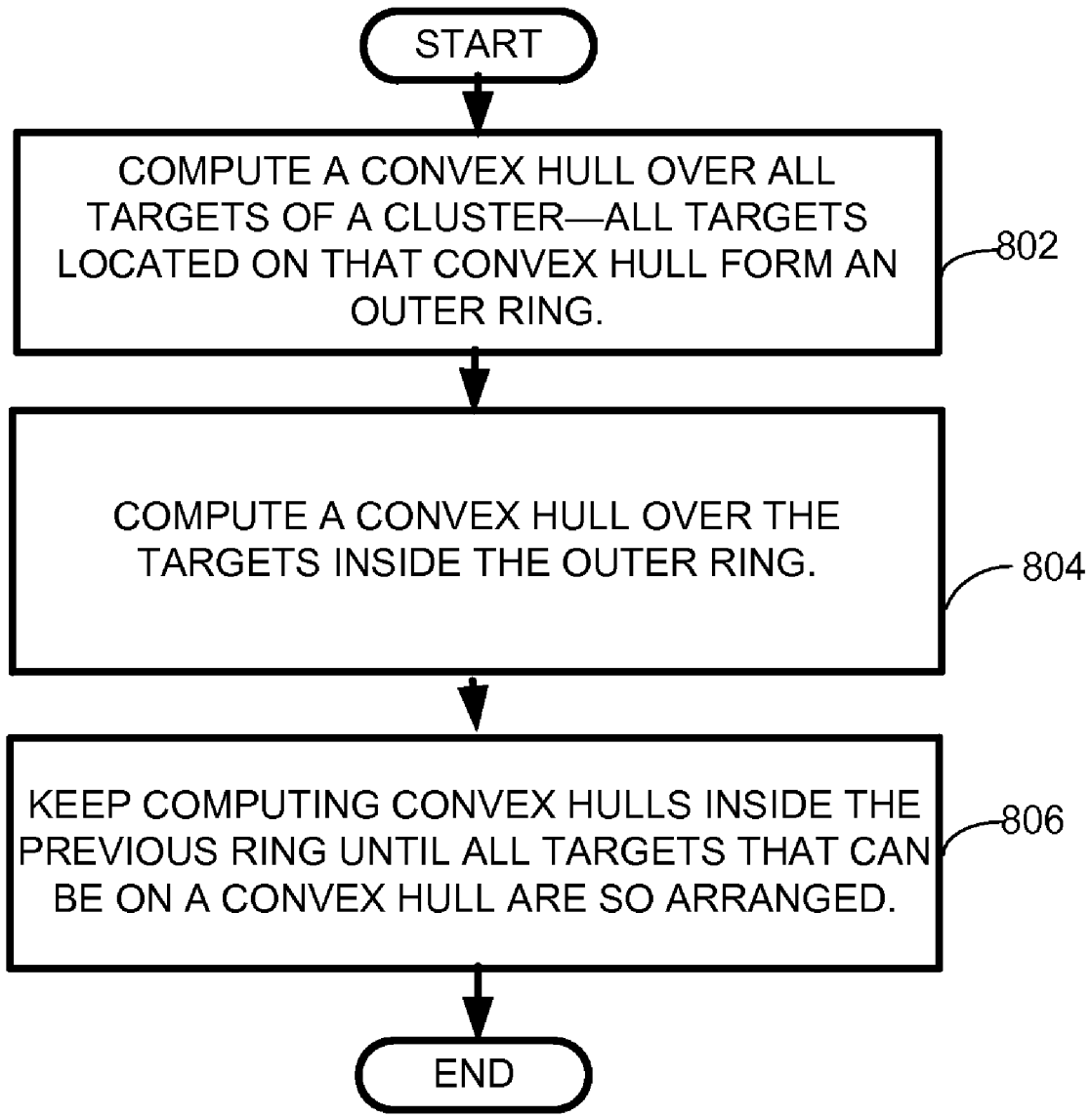
FIG. 8 is a flow diagram depicting an exemplary process of organizing targets into nested rings in one embodiment of the present starburst target expansion technique.

In one embodiment, the starburst target expansion technique organizes the targets of each clique into a set of nested rings, as shown in FIG. 8. The technique starts by computing the convex hull over all targets of a cluster (block 802). All targets located on that convex hull form the outer ring (FIG. 6, third row, left image). Then the present starburst target expansion technique computes the second ring by computing a convex hull over the remaining targets, and so on (shown in FIG. 6, third row, right image and in FIG. 8, blocks 804, 806).

2.2.4 Creating a Skeleton/Routing Claim Lines.

Figure 9:
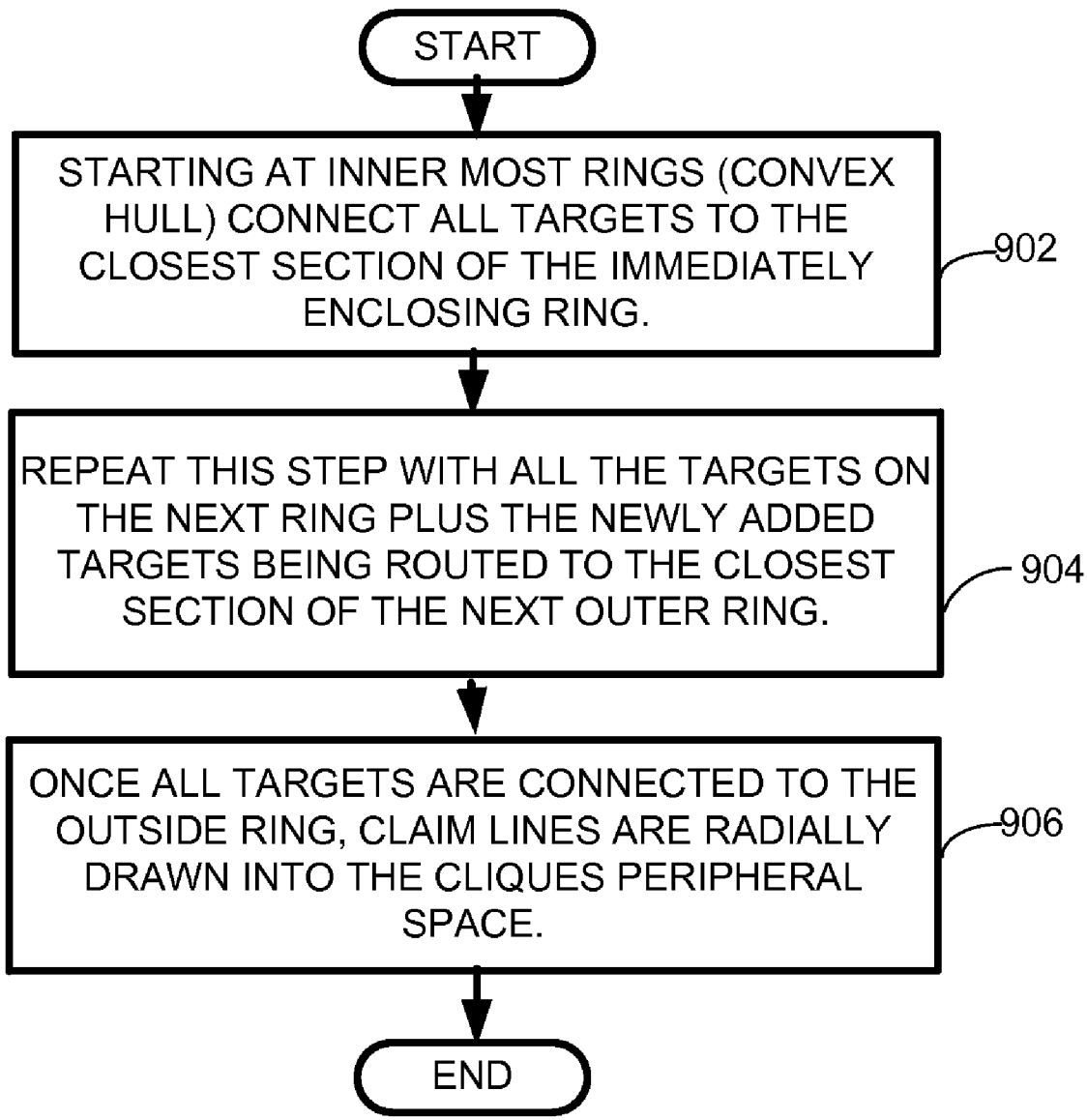
FIG. 9 is a flow diagram depicting an exemplary process of routing claim lines in one embodiment of the present starburst target expansion technique.

Next the present starburst target expansion technique creates a skeleton to be used in growing the targets bigger. In one embodiment this is done by creating claim lines. As shown in FIG. 9, box 902, the technique starts with the innermost ring and connects all its targets to the immediately enclosing ring. In the example shown in FIG. 6, this is shown by the left image in the fourth row. Connecting each claim line to the nearest edge of the outer ring ensures that claim lines never intersect. If multiple claim lines are connected to the same edge, the technique spaces them out equidistantly. Single claim lines are connected in the middle of the ring edge. This helps balance the width of the tiles at the point where they pass between the targets. This embodiment of the present starburst target expansion technique repeats this step, i.e., all targets on the next ring plus the newly added targets are routed to the ring another layer out, as shown in box 904. In the example shown in FIG. 6, in the left image in the fourth row, the deepest clique has two nested rings, so a single iteration is sufficient for connecting all targets to the outer ring. Referring again to FIG. 9, box 906, once all targets are connected to the outside ring, the technique spreads the claim lines radially into the clique's peripheral screen space. This is shown in the example in FIG. 6, the right image of row 4.

2.2.5 Growing Claim Lines into Tiles.

Figure 10:
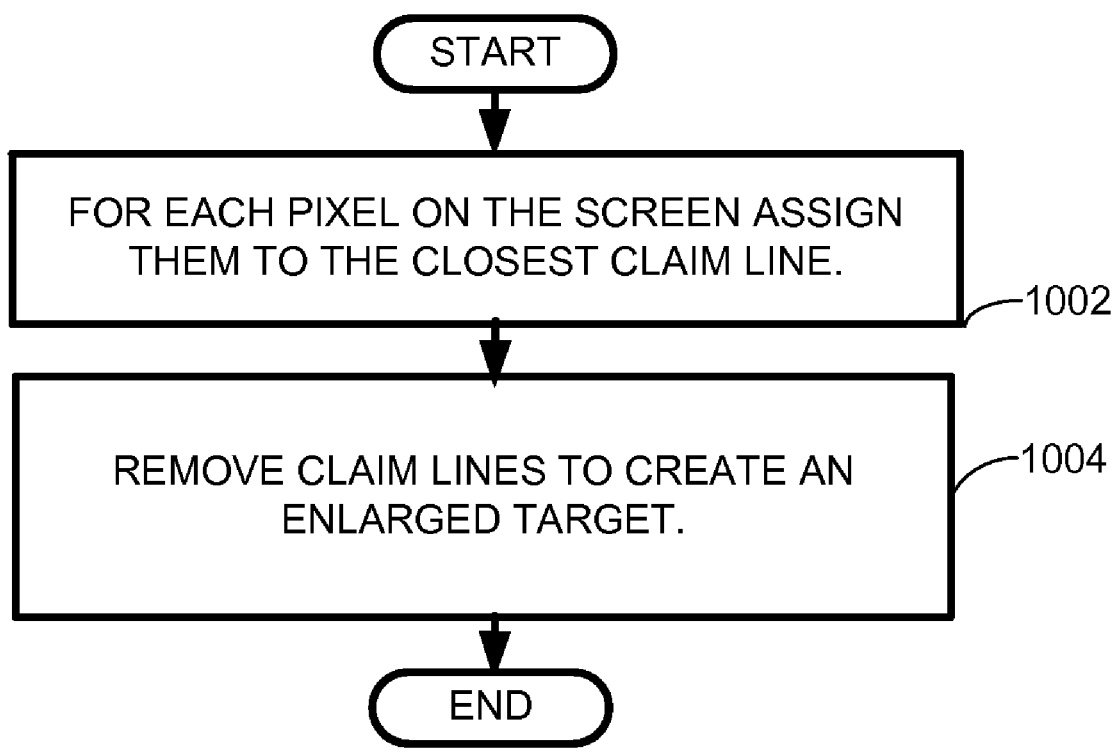
FIG. 10 is a flow diagram depicting an exemplary process of growing claim lines into expanded target tiles in one embodiment of the present starburst target expansion technique.

Once the skeleton or claim lines are routed, the present starburst target expansion technique creates the expanded target tiles. As shown in FIG. 10, box 1002, the technique does this by assigning all pixels on the screen to the target with the closest claim line. In FIG. 6, this is shown in the fifth row, the left image. The enlarged target tile is thus created, and the claim lines can be removed, as shown in FIG. 1004 and in FIG. 6, the fifth row, right image.

2.3 User Interface Visuals.

Figure 11:
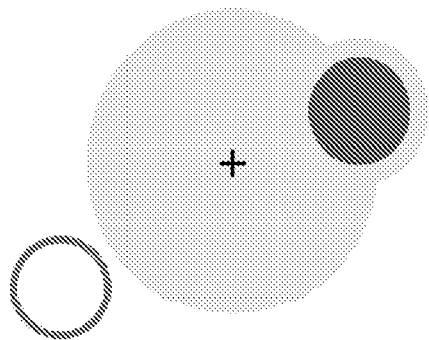
FIG. 11 provides an example of how the bubble cursor target expansion technique disambiguates target candidates.
Figure 12:
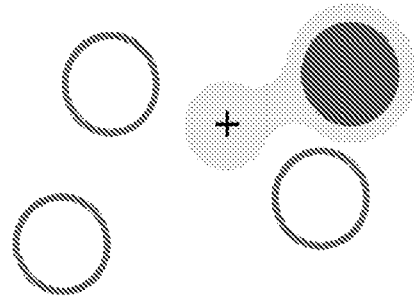
FIG. 12 provides an example of how the present starburst target expansion technique disambiguates the same targets as shown in FIG. 11.

There are different ways of offering the present starburst target expansion technique's tile layouts to the user. One approach is to transfer bubble cursor's technique on hover approach (as shown in FIG. 11) to the present starburst target expansion techniques (FIG. 12). In both cases, a light gray bubble encloses the pointer (black cross) and the selected target (darkly filled dot). The target selected by the present starburst target expansion technique, however, may not be the closest. To prevent closer targets from being included, the bubble may need to stretch further than bubble cursor's, resulting in the rubber band-like effect shown in FIG. 12. On-hover visuals may not always be easy to predict for users. It has been shown that it is more predictable and thus more effective to show the actual tessellation (tiled layout).

Figure 13:
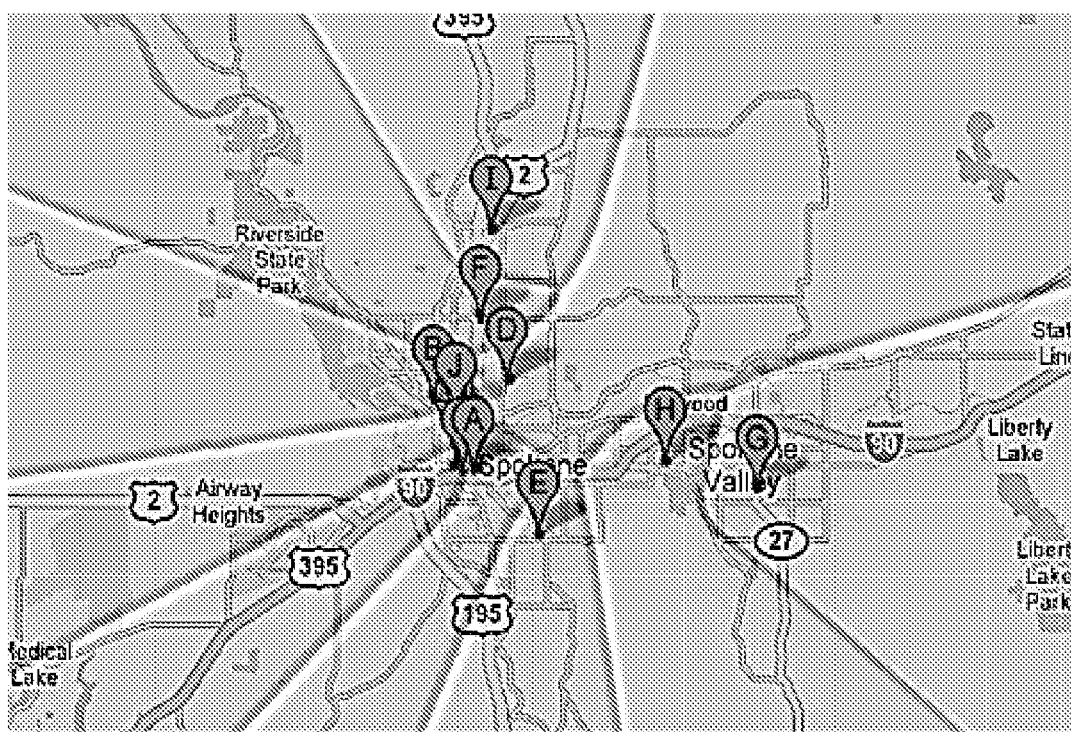
FIG. 13 provides an example of a starburst target expansion overlaid onto screen content, which in this case is a map.

FIG. 13 shows an example with tile boundaries overlaid on screen content. An additional benefit of the overlay approach is that it is compatible with devices that do not support a tracking state, such as resistive touch screens.

3.0 Alternate Embodiments

This section discusses some alternate embodiments of the present starburst target expansion technique. Those with ordinary skill in the art will know that many other variations are possible.

3.1 Variations on Growing Claim Lines

Controlling tile growth requires control over shapes on a higher level than pixels or edges. Hence, as discussed previously, the present starburst target expansion technique employs a skeleton—a concept well understood in computer graphics. Claim lines are one form of a skeleton that can be used in target tile growth. They allow direction of target growth towards available space and prevent uncontrolled expansion. Yet, the resulting target tiles are not limited to straight edged or convex shapes.

In routing claim lines between the rings (either inside out or outside in), a key consideration is to route them in such a way that the lines do not intersect each other. One way to accomplish this is by routing the lines onto the edge of the next convex hull that is closest to the current line head, but does not intersect the convex hull that head is on currently. There are other ways of routing claim lines so that they do not intersect each other, that either optimize for having the lines be less bent (which helps with the visual clarity of the resulting layouts), or optimize for the lines to have more even spacing between them (which helps to achieve more even sizing of the resulting tiles).

Figure 14:
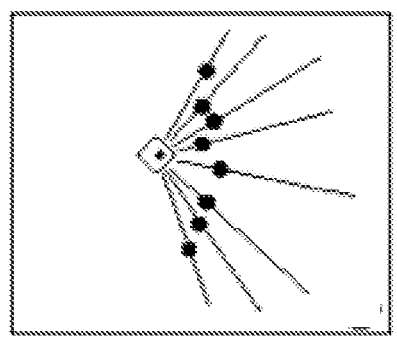
FIG. 14 provides an example of one embodiment of the present starburst target expansion technique.

One embodiment the present starburst target expansion technique employs a "center point" method by creating each claim line by drawing a straight line from a single "center point" of a target cluster through the individual targets. While this technique works well for certain target layouts, long strips of targets result in inefficient space usage. In the example shown in FIG. 14, more than half of the screen space is assigned to the top-most target and the bottom-most target.

To address these shortcomings, the degrees of freedom of the technique can be increased. In the "aversion" method of routing claim lines, each claim line controls its own direction and consists of multiple segments. Each line segment starts at its respective target and is then grown iteratively. The direction for each additional line segment is chosen such that it avoids other lines. Claim lines originating at the inside of a cluster are grown first, allowing them to find their way around outer targets before these could block the way.

Growing claim lines in smaller steps across crowded screen areas allows claim lines to avoid other targets and lines. The nested ring approach presented earlier produces only the bare minimum of line segments—less than the number of nested layers times the number of targets. This resulted in cleaner layouts, faster computation, and the desired degree of control.

Figure 15:
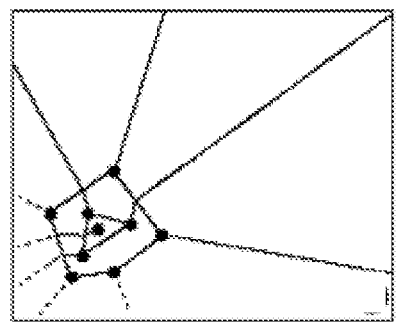
FIG. 15 provides an example of how screen space for target expansion can be limited when targets are near the edge of a display.

The present starburst target expansion technique, as described earlier, improves target tile layouts by reallocating screen space from donors to recipients. While the technique delivers good results for the average case, it can lead to sub-optimal results if the supply of screen space is distributed unequally around a cluster. In the example shown in FIG. 15, for example, the five claim lines in the bottom left access only limited amounts of screen space. In the following, an extension of the present starburst target expansion technique that causes it to take the availability of screen space into account is described. The technique is another method of routing claims lines from the one that is shown in FIG. 9. This variation of routing claim lines is shown in the flow chart of FIG. 16.

Figure 17:
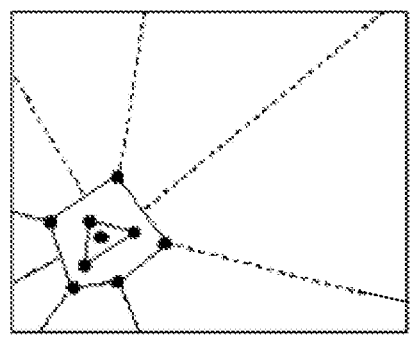
FIG. 17 is an example of a target expansion created by an embodiment of the present starburst target expansion technique.
Figure 16:
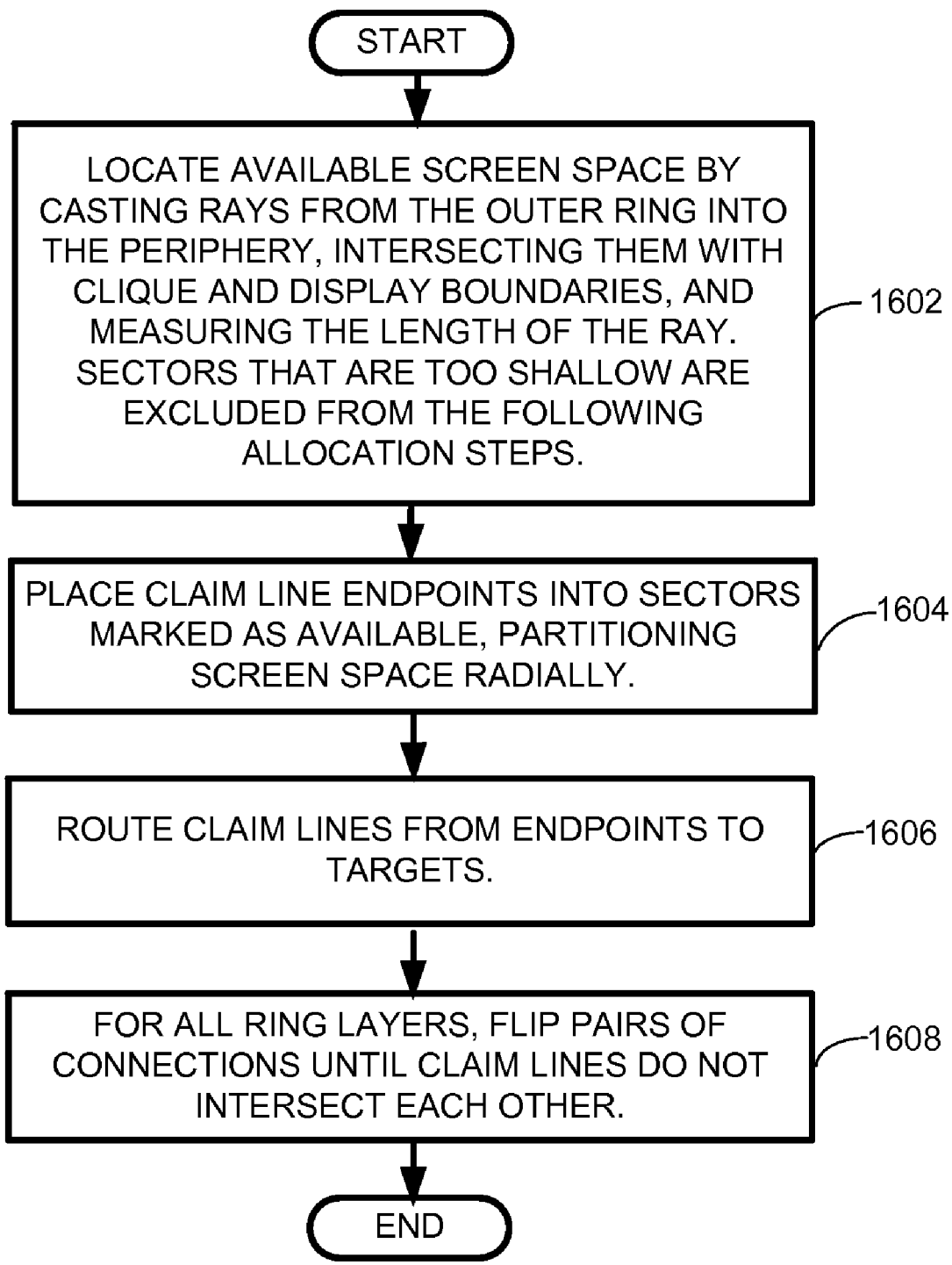
FIG. 16 is a flow diagram depicting another exemplary process of routing claim lines employed in one embodiment of the present starburst target expansion technique.

As shown in FIG. 16, box 1602, to probe space availability, this technique casts rays from the outer ring into the periphery, intersects them with the clique boundaries (dashed and dotted lines in FIG. 17), and measures the length of the ray. Sectors that are too "shallow" are excluded from the following space allocation steps (finely dotted lines in FIG. 17). The technique then places claim line endpoints into the sectors marked as available, as shown in FIG. 16, box 1604. For a reasonably small number of targets per clique, such as 20, the technique partitions screen space radially as shown in FIG. 18. The starburst target expansion technique then descends claim lines from the endpoints to the closest segment of the outer ring, as shown in FIG. 16, box 1606. Then it flips pairs of connections until claim lines do not intersect each other anymore (box 1608). It repeats this step for all remaining ring layers.

For clusters with more than 20 targets, spreading claim line endpoints along a single arc produces target shapes so thin that they can be hard to acquire. To avoid this, the present starburst target expansion technique handles large numbers of endpoints by laying them out in two or more layers as shown in FIG. 19 (this example uses the eight target layout from FIG. 20 to allow juxtaposing the resulting layouts). When growing claim lines into tiles, endpoints are given additional "attraction". This causes tiles to inflate around their endpoints, which provides tiles with a "handle", making them easier to acquire. FIG. 21 shows the resulting tile layout.

3.2 Expanding Targets Starting with Arbitrary Target Shapes.

In one embodiment, the present starburst target expansion technique expands targets starting with arbitrary target shapes, such as buttons in graphical user interfaces. This is achieved by breaking down the shape into separate points (for example, points that approximate a shape that is a polygon or is a convex hull). Then the claim lines are routed from these points that approximate the arbitrary target shape. Tiles are then built as the union of tiles based on each arbitrary shape's points.

3.3 Fine Tuning the Shapes of Produced Tile by Using a Probabilistic Pointing Approach.

In one embodiment, the present starburst target expansion technique fine tunes the shapes of produced tiles by employing a probabilistic pointing approach. The shapes of the tiles are fine tuned by considering the probability (or frequency) of a user targeting each target. In one implementation, the present starburst target expansion technique builds claim lines in the same way as discussed above, but when expanding the lines into tiles it considers a distance function point-to-claim-line weighted by probability of that claim line. That is, the claim line of a target that is frequently selected has more "attraction power", and the space built around is thicker. Claim lines of rarely selected targets only are able to attract points in the thin space around them.

Another embodiment of the present starburst target expansion technique fine tunes the tile shapes by varying attraction power along the claim line itself. For example, one embodiment of the present starburst target expansion technique distributes the attraction power in such a way that as the end of the claim line is approached, that attraction power grows more (it is able to attract points from further distances). As a result, the tiles tend to stay thinner along parts that route the tile into available white space, but expand in that space. In this embodiment the lengths of the claim lines are alternated or even arranged in a pattern in the available outer space.

In summary, the present starburst target expansion technique extends the concept of target expansion to target layouts that contain clusters. Studies have shown how the presence of target clusters limits the applicability of Voronoi-based target expansion techniques and demonstrated substantial performance benefits for the present starburst target expansion technique. People manipulating targets acquired targets in tiles layouts generated using the present target expansion technique faster and with a substantially lower error rate than tiles generated by the Voronoi conditions. Tighter clusters and more targets increased the gap in performance.

It should also be noted that any or all of the aforementioned embodiments throughout the description may be used in any combination desired to form additional hybrid embodiments.

Wherefore, what is claimed is:

1. A computer-implemented process for expanding targets on a display, comprising:
using a computing device for:
analyzing a display containing multiple targets to identify available space for expanding the multiple targets; and
expanding one or more targets into the available space, comprising:
organizing the multiple targets into cliques of donors of screen space and recipients of screen space;
organizing the multiple targets into nested rings;
routing claim lines from each of the multiple targets towards the periphery of the display using the nested rings; and
growing the claim lines into tiles that utilize the available space.

2. The computer-implemented process of claim 1 wherein analyzing the display comprises:
performing a Voronoi tessellation on the targets to obtain a tile for each target;
designating the targets corresponding to the small tiles as targets in need of expansion.

3. The computer-implemented process of claim 1 wherein organizing targets into cliques of donors and participants comprises:
creating cliques of targets based on adjacency, wherein each target in the clique is a recipient of screen space;
adding all donors immediately adjacent to the cliques to the clique;
if a donor is adjacent to multiple cliques adding the donor to the smallest average tile size; and
adding additional donors if they are particularly large or they are located in an area in which a clique lacks good donors.

4. The computer-implemented process of claim 1 wherein organizing targets into nested rings comprises:
computing a convex hull over all targets of a clique to create an outer ring;
computing a convex hull over the targets inside the outer ring to create an inner ring;
continuing to compute a convex hull inside the previous inner ring to create a new inner ring until no further convex hulls can be created.

5. The computer-implemented process of claim 4 wherein routing claim lines comprises:
starting at the inner most ring, connecting all targets to the closest section of the immediately enclosing ring by drawing a portion of the claim line;
for each ring outside the inner most ring, routing all the targets on or inside that ring to the closest section of the next out ring, by drawing a portion of a claim line; and
once all targets are connected to the outmost ring, drawing claim lines radially into peripheral display space.

6. The computer-implemented process of claim 5 wherein the portions of the claim lines are drawn from a target to the mid-section of the closest ring section.

7. The computer-implemented process of claim 1 wherein growing the claim lines into tiles that use available space comprises:
for each pixel on the screen assigning it to the closest claim line.

8. The computer-implemented process of claim 4 wherein routing the claim lines comprises:
locating available screen space by casting rays from the outer ring into the periphery of the display, intersecting said rays with clique and display boundaries and measuring the length of each ray, and using the rays to define boundaries of sectors of the display;
excluding any sectors that are too shallow from further processing;
placing claim line end points into sectors not excluded to partition the screen space radially; and
routing claim lines from the claim line end points to a target.

9. The computer-implemented process of claim 8 wherein the endpoints are layered in a staggered fashion.

10. A computer-readable medium having computer-executable instructions for performing the process recited in claim 1.

11. A process for expanding targets in a cluster on a display into available screen space comprising:
using a computing device for:
identifying targets that require additional expansion;
organizing targets into cliques of space donors and space recipients;

creating a skeleton to be used for growing targets into available display space using the cliques of space donors and space recipients; and growing the targets into tiles that utilize available space using the skeleton.

12. The computer-implemented process of claim 11 wherein identifying targets that need expansion, comprises:

performing a Voronoi tessellation on the targets to obtain a tile for each target;

identifying small tiles by identifying those tiles with tile sizes far below the average tile size; and designating the targets corresponding to the small tiles as targets in need of expansion.

13. The computer-implemented process of claim 11 wherein the action of expanding each target into the available space comprises for each pixel on the screen assigning it to the closest portion of the skeleton.

14. A system for expanding targets in target clusters on a computer display, comprising:

a target expansion module for identifying targets that require additional expansion;

a clique organization module for organizing targets into cliques of space donors and space recipients;

a nested ring organization module for organizing the targets of each clique into nested rings using the cliques of space donors and space recipients;

a skeleton routing module for creating a skeleton by routing lines to be used for expanding targets into available display space; and a skeleton growing module for growing the targets into expanded tiles that utilize available space using the skeleton.

15. The system of claim 14 wherein the target expansion module comprises:

a sub-module for performing a Voronoi tessellation on the targets to obtain a tile for each target;

a sub-module for identifying small tiles by identifying those tiles with tile sizes far below the average tile size; and a sub-module for designating the targets corresponding to the small tiles as targets in need of expansion.

16. The system of claim 14 wherein the skeleton growing module grows targets into expanded tiles by assigning all pixels of the display to a portion of the skeleton each pixel is closest to.

17. The system of claim 14 wherein the targets are of arbitrary shapes defined by a set of points.

18. The system of claim 14 wherein the shapes of the tiles are adjusted by considering the probability of a user selecting a given target.

19. The system of claim 14 wherein the shapes of the tiles are adjusted by varying the pixels associated with a given skeleton portion based on the available space around the given portion of the skeleton.

* * * * *